April 26, 1949.  F. P. WILLCOX  2,468,475
CHAMFERING TOOL
Filed June 18, 1946

Frederick P. Willcox,
INVENTOR.

BY Homer R. Montague

Patented Apr. 26, 1949

2,468,475

UNITED STATES PATENT OFFICE 2,468,475

CHAMFERING TOOL

Frederick P. Willcox, Vestal, N. Y.

Application June 18, 1946, Serial No. 677,488

2 Claims. (Cl. 90—12)

This invention relates to hand tools. It is an object of the invention to provide a hand tool which is adapted to perform certain functions which must at present be accomplished by exceedingly tedious and inaccurate methods, and to perform them in a rapid, efficient and workmanlike manner.

In small machine shops, repair establishments, model shops and the like, it is frequently necessary to alter the lengths of machine screws, cap screws and the like, in order to enable a requirement for a screw of non-standard or unavailable length to be made from available standard screws. In such cases, a sufficiently long screw is merely cut to the desired length, but since this results in a burr at the cut end, as well as causing collapse of the threads adjacent that end, it is further necessary to chamfer such end. This chamfering is usually done with a file, while turning the screw by hand, or occasionally it is done by holding the screw at an angle to a grindstone. In either event, the operation is an exceedingly tedious one, and is inaccurate and wasteful, since the entire screw is frequently spoiled.

It is also occasionally necessary to chamfer the ends of small rods, dowels or other parts, made of metal or plastic, and such operations are also very tedious and wasteful. Even where a machine lathe is available to permit accurate work, the set-up time of the lathe is longer than the time required for the hand operation, which renders the use of a lathe inefficient.

It is therefore an object of my invention to provide a hand chamfering tool adapted to perform the operations indicated above, with a minimum of wasted time, and a maximum of accuracy in the resulting piece. It is a further object to provide such a tool which may be provided with a handle, or which may be chucked in an ordinary hand drill, such as a push drill, and which will be simple to manufacture and of low cost.

It is a further object of the invention to provide, in a tool of the class described, means for the rapid and efficient removal of chips of metal or plastic from the cutting portion of the tool, whereby to prevent the same from interfering with rapid and efficient operation of the tool.

Figure 1:
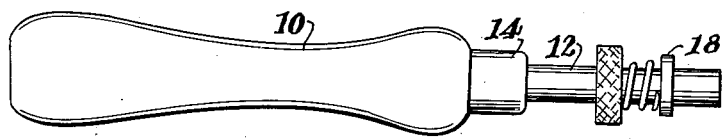
Figure 2:
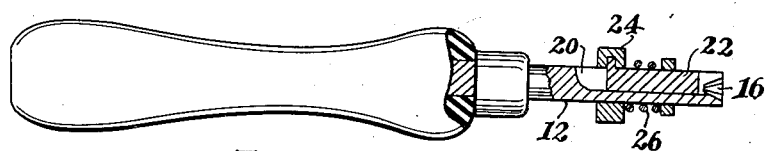
Figure 3:
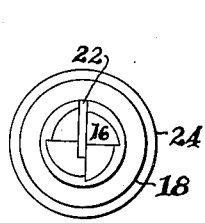
Figure 4:
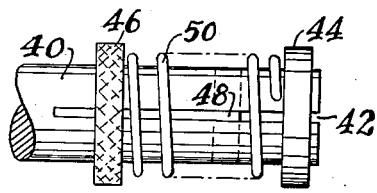
Figure 6:
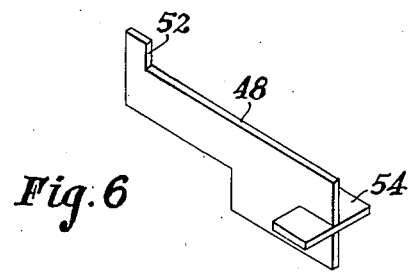
Figure 5:
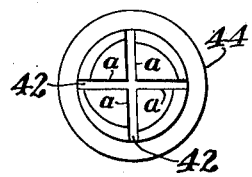
Figure 7:

Other objects and advantages of my invention will be understood from the accompanying description of a preferred embodiment thereof, taken in connection with the accompanying drawings, in which Fig. 1 is a side elevational view of a preferred form of my improved device, Fig. 2 is a view of the device shown in Fig. 1, but with the operating parts shown in section, Fig. 3 is an end view, in elevation, of the device shown in Fig. 1, Fig. 4 is a side view of the operating portion of a modified form of the invention, Fig. 5 is an end view of the same, Fig. 6 is a perspective view of the operating blade of the form of the invention shown in Figs. 4 and 5, and Fig. 7 is a sectional view of the operative end of a more simple form of construction than those mentioned above.

Referring now to Fig. 1 of the drawings, reference character 10 denotes an ordinary form of tool handle, which may be of plastic, metal or wood. Secured to handle 10, as by the usual ferrule 14, is a cylindrical shank of metal, the end of which, as best shown in Figs. 2 and 3, is provided with the internal, conically arranged cutting edges 16. It will be understood that if a machine screw, rod or the like is introduced into the conical recess and the device rotated about the extended axis of such piece, the end of the piece may be given a chamfer of any desired size up to the limits of the tool.

In order to permit the device to be cleared of chips removed from the work piece, and prevent their jamming between the cutting edges 16, shank 12 may be provided with a longitudinal slot 20, of depth preferably somewhat greater than the radius of the shank. A fixed collar or retainer ring 18 is secured to the shank 12 as shown in Fig. 1, and a clearing blade 22, of thickness permitting it to slide freely, is inserted in the slot. An operating ring 24, which may be knurled, is fastened to blade 22 so as to enable the user to move the blade forward, whereupon its front end will act to clear chips from the spaces between the cutting edges 16. A spring 26 may be placed between rings 18 and 24, so that the blade 22 is normally retracted into the shank, where it does not interfere with the use of the cutter.

I have found that the single blade just described is often sufficient to clear chips from all of the spaces between the cutting edges, even though the blade itself intersects less than all of said spaces. This is apparently due to the fact that, when material cut from a work piece is forced into said spaces by the progressive motion of the work piece into the conical hollow, such chips are more or less connected with one another. Hence, operation of blade 22 to dislodge chips from one or a few of the spaces will usually be found to dislodge chips from others as well. The interconnection of chips probably results from the diminishing size of the spaces between the teeth 16 as the work piece enters the conical portion, and hence the chips are forced inwardly in both longitudinal and radial senses, their rough nature serving to produce a certain twining which bridges the teeth themselves, and enabling substantially all of the chips to be dislodged by an ejecting force applied to only a part of them.

In order to provide for positive removal of the chips from each and all of the spaces between teeth, the form shown in Figs. 4 to 6 may be adopted at somewhat greater expense of construction. In this form, the shank 40, which is provided with the conically arranged teeth as in the previous form, has a pair of slots 42 which intersect each other at right angles, and which pass through the spaces adjacent each of the teeth, whose cutting edges are indicated by the letters *a* in Fig. 5. A clearing member 48 best shown in Fig. 6 is mounted to slide in one of the slots, and is provided with a cross-blade 54 which slides in the other of the slots. Member 48 is attached to an operating collar 46 by the tang 52, and operates against the restoring pressure of a spring 50 which abuts against a fixed collar 44 tightly secured to the shank 40 adjacent its outer end. The presence of collar 44 near the end serves to maintain the cutting teeth in proper relationship and against spreading, notwithstanding the presence of the slots in the shank.

In the form just described, and referring to Fig. 5, the presence of a slot behind the trailing edge *a* of each cutting tooth enables the production of a sharp edge for each tooth with very little difficulty, notwithstanding the reentrant nature of the cutting surfaces.

The modification shown in Fig. 7 is similar to the forms described above, except that the chip ejector is omitted, providing a device which is very economical to manufacture. In this form the shank 12' is provided simply with the conically arranged internal teeth 16'. In operation, the device of Fig. 7 is used just as the forms shown in Figs. 1 to 6 but, of course, the chips must be dislodged occasionally, either by knocking the tool sharply against a solid object, or by removing them with a pointed instrument.

While I have shown the device as provided with a manual type of handle, I have found it very convenient to omit the handle and chuck the shank portion in an ordinary type of twist drill or push drill mechanism. The use of the device in such a manner enables chamfers to be put on small screws, bolts and the like very rapidly, and without any extensive set-up time, since the part being chamfered can generally be grasped in one hand leaving the other free to operate the tool.

I have shown certain specific embodiments of my invention, but I wish it to be understood that the invention can be carried out by many equivalent structures, and I therefore do not wish to limit my invention to the forms disclosed, except as required by the scope of the appended claims.

I claim:
1. A hand chamfering tool comprising a cylindrical shank, a recess in one end of said shank, a plurality of cutting teeth in said recess with their cutting edges arranged on the surface of a cone, said shank being formed with a passageway extending lengthwise thereof and in communication with said recess, and means movably mounted in said passageway to eject chips from said recess.

2. The invention of claim 1, in which said means comprises a bar reciprocable in a longitudinal slot in said passageway.

FREDERICK P. WILLCOX.

REFERENCES CITED

The following references are of record in the file of this patent:

UNITED STATES PATENTS

| Number | Name | Date |
|---|---|---|
| 1,927,463 | McIntosh | Sept. 19, 1933 |